United States Patent
Xu et al.

(10) Patent No.: US 12,438,385 B2
(45) Date of Patent: Oct. 7, 2025

(54) METHOD AND DEVICE FOR ESTIMATING SOC OF BATTERY PACK, AND BATTERY MANAGEMENT SYSTEM

(71) Applicant: CONTEMPORARY AMPEREX TECHNOLOGY CO., LIMITED, Ningde (CN)

(72) Inventors: Guangyu Xu, Ningde (CN); Shichao Li, Ningde (CN); Wei Zhao, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 528 days.

(21) Appl. No.: 17/825,714

(22) Filed: May 26, 2022

(65) Prior Publication Data
US 2022/0285958 A1    Sep. 8, 2022

Related U.S. Application Data

(63) Continuation of application No. PCT/CN2021/079174, filed on Mar. 4, 2021.

(51) Int. Cl.
*G01R 31/367* (2019.01)
*G01R 31/382* (2019.01)
(Continued)

(52) U.S. Cl.
CPC .......... *H02J 7/0049* (2020.01); *G01R 31/367* (2019.01); *G01R 31/382* (2019.01);
(Continued)

(58) Field of Classification Search
CPC .... H02J 7/0049; H02J 7/005; H02J 7/007182; H02J 7/0016; G01R 31/392; G01R 31/396; G01R 31/367; G01R 31/382
See application file for complete search history.

(56) References Cited

U.S. PATENT DOCUMENTS

| | | | |
|---|---|---|---|
| 3,980,940 A | * | 9/1976 | Mabuchi ............... H02J 7/0016 320/127 |
| 2007/0166607 A1 | | 7/2007 | Okada et al. |

(Continued)

FOREIGN PATENT DOCUMENTS

| | | |
|---|---|---|
| CN | 111142027 A | 5/2020 |
| CN | 111159916 A | 5/2020 |

(Continued)

OTHER PUBLICATIONS

Machine translation of CN-112213648-A. (Year: 2021).*
(Continued)

*Primary Examiner* — Drew A Dunn
*Assistant Examiner* — Pamela J Jeppson
(74) *Attorney, Agent, or Firm* — Ladas & Parry LLP

(57) ABSTRACT

This application provides a method and device for estimating a SOC of a battery pack, and a battery management system. The battery pack includes a first cell without a plateau and a second cell with a plateau. At least one first cell is serially connected to the second cell. The method includes: determining a capacity variation of the battery pack based on a SOC variation of the first cell in comparison with an initial SOC of the first cell, and based on a nominal capacity of the first cell; obtaining an equalization capacity of the first cell and an equalization capacity of the second cell; and estimating a SOC of the second cell, and determining the SOC of the battery pack based on the SOC of the second cell.

16 Claims, 4 Drawing Sheets

(51) Int. Cl.
*G01R 31/392* (2019.01)
*G01R 31/396* (2019.01)
*H02J 7/00* (2006.01)

(52) U.S. Cl.
CPC ......... *G01R 31/392* (2019.01); *G01R 31/396* (2019.01); *H02J 7/0016* (2013.01); *H02J 7/005* (2020.01); *H02J 7/007182* (2020.01)

(56) References Cited

U.S. PATENT DOCUMENTS

| | | |
|---|---|---|
| 2010/0225325 A1 | 9/2010 | Christensen et al. |
| 2012/0065824 A1* | 3/2012 | Takahashi .......... G01R 31/3828 903/903 |
| 2016/0233696 A1 | 8/2016 | Mei et al. |
| 2019/0004121 A1* | 1/2019 | Sano ...................... G01R 31/36 |

FOREIGN PATENT DOCUMENTS

| | | | | |
|---|---|---|---|---|
| CN | 111796185 A | | 10/2020 | |
| CN | 111929595 A | | 11/2020 | |
| CN | 112213648 A | * | 1/2021 | ......... G01R 31/3828 |
| FR | 2923022 A1 | | 5/2009 | |
| JP | 2010266221 A | | 11/2010 | |
| WO | 2010140044 A1 | | 12/2010 | |
| WO | 2013159979 A1 | | 10/2013 | |
| WO | 2018155247 A1 | | 8/2018 | |

OTHER PUBLICATIONS

International Search Report of Application No. PCT/CN2021/079174, mailed Dec. 8, 2021.
Written Opinion of International Search Authority for Application No. PCT/CN2021/079174, mailed Dec. 8, 2021.
Extended European Search Report of EP Application No. 21765814.5, mailed Sep. 8, 2022.

* cited by examiner

METHOD AND DEVICE FOR ESTIMATING SOC OF BATTERY PACK, AND BATTERY MANAGEMENT SYSTEM

CROSS-REFERENCE TO RELATED APPLICATIONS

This application is a continuation of International Patent Application No. PCT/CN2021/079174, filed on Mar. 4, 2021, which is incorporated herein by reference in its entirety.

TECHNICAL FIELD

This application relates to the technical field of batteries, and in particular, to a method and device for estimating a SOC of a battery pack, and a battery management system.

BACKGROUND

A power battery serves as a power source of a new energy vehicle, and the status of the power battery is strictly controlled by a battery management system (BMS). A state of charge (SOC) of the battery is an important parameter for estimating a cruising range of the new energy vehicle. A SOC value is a ratio of a currently available capacity to a nominal capacity of the battery, usually expressed as a percentage and ranging from 0 to 1.

Generally, in the prior art, a method for obtaining the state of charge (SOC) is to estimate the SOC based on a voltage value as well as a curve of the state of charge and an open circuit voltage (a SOC-OCV curve). For a cell with a voltage plateau (the voltage in the plateau little varies, and a voltage variation corresponding to each 1% of SOC variation is less than 1 mV), accuracy of estimating the SOC based on the voltage is not high.

SUMMARY

In view of the foregoing, an objective of this application is to provide a method and device for estimating a SOC of a battery pack, and a battery management system to mitigate the problem that the SOC of a battery cannot be estimated accurately in the prior art.

Embodiments of this application are implemented in the following way.

According to a first aspect, an embodiment of this application provides a method for estimating a SOC of a battery pack. The battery pack includes a first cell without a plateau and a second cell with a plateau. At least one first cell is serially connected to the second cell. The method includes: determining a capacity variation of the battery pack based on a SOC variation of the first cell in comparison with an initial SOC of the first cell, and based on a nominal capacity of the first cell; obtaining an equalization capacity of the first cell and an equalization capacity of the second cell; estimating a SOC of the second cell based on the capacity variation of the battery pack, the nominal capacity of the first cell, the equalization capacity of the first cell, the equalization capacity of the second cell, and an initial SOC of the second cell, and determining the SOC of the battery pack based on the SOC of the second cell.

In this embodiment of this application, the first cell without a plateau is introduced, and the first cell is serially connected to the second cell with a plateau. In this way, the capacity variation of the battery pack can be determined based on the SOC variation of the first cell in comparison with the initial SOC of the first cell, and based on the nominal capacity of the first cell. Then the equalization capacity of the first cell and the equalization capacity of the second cell are obtained. Finally, the SOC of the second cell can be estimated precisely based on the capacity variation of the battery pack, the nominal capacity of the first cell, the equalization capacity of the first cell, the equalization capacity of the second cell, and the initial SOC of the second cell, thereby solving the problem of low accuracy of estimating the SOC based on a voltage value and a SOC-OCV curve in the prior art when the cell has a plateau.

In a possible implementation with reference to the embodiment of the first aspect, the determining a capacity variation of the battery pack based on a SOC variation of the first cell in comparison with an initial SOC of the first cell, and based on a nominal capacity of the first cell includes: determining the capacity variation of the battery pack based on the SOC variation of the first cell in comparison with the initial SOC of the first cell, and based on the nominal capacity of the first cell and an SOH of the first cell.

In this embodiment of this application, in determining the capacity variation of the battery pack, the state of health (SOH) of the first cell is also taken into account, thereby eliminating an impact caused by a loss or aging phenomenon of the battery in use, and improving the precision of subsequently estimating the SOC of the second cell.

In a possible implementation with reference to the embodiment of the first aspect, the estimating a SOC of the second cell based on the capacity variation of the battery pack, the nominal capacity of the first cell, the equalization capacity of the first cell, the equalization capacity of the second cell, and an initial SOC of the second cell includes: estimating the SOC of the second cell based on the capacity variation of the battery pack, the nominal capacity of the first cell, the equalization capacity of the first cell, the SOH of the first cell, the equalization capacity of the second cell, and the initial SOC of the second cell.

In this embodiment of this application, in estimating the SOC of the second cell, the state of health (SOH) of the first cell is also taken into account, thereby eliminating an impact caused by a loss or aging phenomenon of the battery in use, and improving the precision of estimating the SOC of the second cell.

In a possible implementation with reference to the embodiment of the first aspect, a process of obtaining the SOC variation of the first cell in comparison with an initial SOC of the first cell includes: obtaining the SOC variation of the first cell based on the SOC of the first cell and the initial SOC of the first cell, where, if an open circuit voltage of the second cell is currently located in a plateau of a SOC-OCV curve of the second cell, the initial SOC of the first cell is an initial SOC of the first cell that is obtained and stored when the open circuit voltage of the second cell is previously not located in the plateau of the SOC-OCV curve; or, if an open circuit voltage of the second cell is currently not located in a plateau of a SOC-OCV curve of the second cell, the initial SOC of the first cell is a latest initial SOC obtained currently.

In this embodiment of this application, the initial SOC of the first cell is updated in real time. If the open circuit voltage of the second cell is currently located in the plateau of the SOC-OCV curve of the second cell, the initial SOC is the initial SOC of the first cell that is obtained and stored when the open circuit voltage of the second cell is previously not located in the plateau of the SOC-OCV curve; or, if the open circuit voltage of the second cell is currently not located in the plateau of the SOC-OCV curve, the initial SOC is the latest initial SOC obtained currently, thereby ensuring that the determined variation of the battery pack is accurate and reliable, and ensuring the accuracy of subsequently estimating the SOC of the second cell.

In a possible implementation with reference to the embodiment of the first aspect, if an open circuit voltage of the second cell is currently located in a plateau of a SOC-OCV curve of the second cell, the initial SOC of the second cell is an initial SOC of the second cell that is obtained and stored when the open circuit voltage of the second cell is previously not located in the plateau of the SOC-OCV curve of the second cell; or, if an open circuit voltage of the second cell is currently not located in a plateau of a SOC-OCV curve of the second cell, the initial SOC of the second cell is a latest initial SOC obtained currently.

In this embodiment of this application, the initial SOC of the second cell is updated in real time. If the open circuit voltage of the second cell is currently located in the plateau of the SOC-OCV curve of the second cell, the initial SOC of the second cell is the initial SOC of the second cell that is obtained and stored when the open circuit voltage of the second cell is previously not located in the plateau of the SOC-OCV curve of the second cell; or, if the open circuit voltage of the second cell is currently not located in the plateau of the SOC-OCV curve of the second cell, the initial SOC of the second cell is the latest initial SOC obtained currently, thereby ensuring that the determined variation of the battery pack is accurate and reliable, and ensuring the accuracy of subsequently estimating the SOC of the second cell.

In a possible implementation with reference to the embodiment of the first aspect, the method further includes: obtaining the initial SOC of the first cell and the initial SOC of the second cell, and the obtaining the initial SOC of the first cell and the initial SOC of the second cell includes: obtaining, when it is detected that the second cell is in a fully charged state, the initial SOC of the second cell, obtaining a SOC in which the first cell is located when the second cell is in the fully charged state, and using the obtained SOC as the initial SOC of the first cell; or, obtaining, when it is detected that the second cell is in a low-end static standing state, a sampled voltage of the first cell, and obtaining the initial SOC of the first cell based on a SOC-OCV curve of the first cell, obtaining a sampled voltage of the second cell, and obtaining the initial SOC of the second cell based on a SOC-OCV curve of the second cell.

In this embodiment of this application, by obtaining the initial SOC in which the first cell and the second cell are located when the second cell is in a fully charged state, or by obtaining the initial SOC in which the first cell and the second cell are located when the second cell is in a static standing state, the technical solution of this application can accurately estimate the SOC of the second cell, thereby ensuring accuracy of the solution.

In a possible implementation with reference to the embodiment of the first aspect, the second cell includes a plurality of single cells, and the determining the SOC of the battery pack based on the SOC of the second cell includes: obtaining a maximum SOC and a minimum SOC from a plurality of SOCs of the second cell, where each single cell corresponds to one SOC; and obtaining a weighted SOC of the maximum SOC and the minimum SOC, and using the weighted SOC as the SOC of the battery pack.

In this embodiment of this application, when the second cell includes a plurality of single cells, a maximum SOC and a minimum SOC is obtained from a plurality of SOCs of the second cell, and then a weighted SOC of the maximum SOC and the minimum SOC is obtained as the SOC of the battery pack. The SOC of the battery pack can be accurately estimated by weighting.

In a possible implementation with reference to the embodiment of the first aspect, the method further includes: performing, if the first cell is to be fully discharged first before the second cell, equalization discharge on the second cell to ensure that the second cell is fully discharged first; and performing, if the first cell is to be fully charged first before the second cell, equalization discharge on the first cell to ensure that the second cell is fully charged first.

In this embodiment of this application, in equalizing the first cell and the second cell, if the first cell is to be fully discharged first before the second cell, the equalization discharge is performed on the second cell to ensure that the second cell is fully discharged first; and, if the first cell is to be fully charged first before the second cell, the equalization discharge is performed on the first cell to ensure that the second cell is fully charged first, thereby preventing the first cell from affecting the charge and discharge of the entire battery pack and from becoming a cell that bottlenecks the exertion of the capacity of the battery pack. The charge and discharge of the entire battery pack merely depend on the charge and discharge of the second cell, so that the SOC of the second cell can reflect the SOC of the entire battery pack.

In a possible implementation with reference to the embodiment of the first aspect, a process of determining that the first cell is to be fully discharged or charged first before the second cell includes: determining, based on the initial SOC, the nominal capacity, and an SOH of the first cell, a charge capacity required for fully charging the first cell or a discharge capacity required for fully discharging the first cell; determining, based on the initial SOC, a nominal capacity, and an SOH of the second cell, a charge capacity required for fully charging the second cell or a discharge capacity required for fully discharging the second cell; determining, if the charge capacity of the first cell is less than the charge capacity of the second cell, that the first cell is to be fully charged first before the second cell; and, determining, if the discharge capacity of the first cell is less than the discharge capacity of the second cell, that the first cell is to be fully discharged first before the second cell.

In this embodiment of this application, based on the initial SOC, the nominal capacity, and the SOH of the first cell, the charge capacity required for fully charging the first cell or the discharge capacity required for fully discharging the first cell is determined; and, based on the initial SOC, the nominal capacity, and the SOH of the second cell, the charge capacity required for fully charging the second cell or the discharge capacity required for fully discharging the second cell is determined. Then the discharge capacity of the first cell that is fully discharged is compared with the discharge capacity of the second cell that is fully discharged, so that it can be quickly determined whether the first cell is to be fully discharged or fully charged first before the second cell. In addition, in calculating the charge capacity required for full charge or the discharge capacity required for full discharge, the state of health (SOH) of the cell is also taken into account, thereby eliminating an impact caused by a loss or aging phenomenon of the battery in use, and improving reliability of the solution.

According to a second aspect, an embodiment of this application further provides a device for estimating a SOC of a battery pack. The battery pack includes a first cell without a plateau and a second cell with a plateau. At least one first cell is serially connected to the second cell. The device includes a processing module and an obtaining module. The processing module is configured to determine a capacity variation of the battery pack based on a SOC variation of the first cell in comparison with an initial SOC of the first cell, and based on a nominal capacity of the first cell. The obtaining module is configured to obtain an equalization capacity of the first cell and an equalization capacity of the second cell. The processing module is further configured to estimate a SOC of the second cell based on the capacity variation of the battery pack, the nominal capacity of the first cell, the equalization capacity of the first cell, the equalization capacity of the second cell, and an initial SOC of the second cell, and determine the SOC of the battery pack based on the SOC of the second cell.

In a possible implementation with reference to the embodiment of the second aspect, the processing module is specifically configured to determine the capacity variation of the battery pack based on the SOC variation of the first cell in comparison with the initial SOC of the first cell, and based on the nominal capacity of the first cell and an SOH of the first cell.

In a possible implementation with reference to the embodiment of the second aspect, the processing module is specifically configured to estimate the SOC of the second cell based on the capacity variation of the battery pack, the nominal capacity of the first cell, the equalization capacity of the first cell, the SOH of the first cell, the equalization capacity of the second cell, and the initial SOC of the second cell.

In a possible implementation with reference to the embodiment of the second aspect, the processing module is further configured to: obtain the SOC variation of the first cell based on the SOC of the first cell and the initial SOC of the first cell, where, if an open circuit voltage of the second cell is currently located in a plateau of a SOC-OCV curve of the second cell, the initial SOC of the first cell is an initial SOC of the first cell that is obtained and stored when the open circuit voltage of the second cell is previously not located in the plateau of the SOC-OCV curve; or, if an open circuit voltage of the second cell is currently not located in a plateau of a SOC-OCV curve of the second cell, the initial SOC of the first cell is a latest initial SOC obtained currently.

In a possible implementation with reference to the embodiment of the second aspect, if an open circuit voltage of the second cell is currently located in a plateau of a SOC-OCV curve of the second cell, the initial SOC of the second cell is an initial SOC of the second cell that is obtained and stored when the open circuit voltage of the second cell is previously not located in the plateau of the SOC-OCV curve of the second cell; or, if an open circuit voltage of the second cell is currently not located in a plateau of a SOC-OCV curve of the second cell, the initial SOC of the second cell is a latest initial SOC obtained currently.

In a possible implementation with reference to the embodiment of the second aspect, the processing module is further configured to: obtain, when it is detected that the second cell is in a fully charged state, the initial SOC of the second cell, obtain a SOC in which the first cell is located when the second cell is in the fully charged state, and use the obtained SOC as the initial SOC of the first cell; or, obtain, when it is detected that the second cell is in a low-end static standing state, a sampled voltage of the first cell, and obtain the initial SOC of the first cell based on a SOC-OCV curve of the first cell, obtain a sampled voltage of the second cell, and obtain the initial SOC of the second cell based on a SOC-OCV curve of the second cell.

In a possible implementation with reference to the embodiment of the second aspect, the second cell includes a plurality of single cells, and the processing module is further configured to: obtain a maximum SOC and a minimum SOC from a plurality of SOCs of the second cell, where each single cell corresponds to one SOC; and obtain a weighted SOC of the maximum SOC and the minimum SOC, and use the weighted SOC as the SOC of the battery pack.

In a possible implementation with reference to the embodiment of the second aspect, the device further includes an equalization module, and the equalization module is configured to: perform, if the first cell is to be fully discharged first before the second cell, equalization discharge on the second cell to ensure that the second cell is fully discharged first; and perform, if the first cell is to be fully charged first before the second cell, equalization discharge on the first cell to ensure that the second cell is fully charged first.

In a possible implementation with reference to the embodiment of the second aspect, the equalization module is further configured to: determine, based on the initial SOC, the nominal capacity, and an SOH of the first cell, a charge capacity required for fully charging the first cell or a discharge capacity required for fully discharging the first cell; determine, based on the initial SOC, a nominal capacity, and an SOH of the second cell, a charge capacity required for fully charging the second cell or a discharge capacity required for fully discharging the second cell; determine, if the charge capacity of the first cell is less than the charge capacity of the second cell, that the first cell is to be fully charged first before the second cell; and, determine, if the discharge capacity of the first cell is less than the discharge capacity of the second cell, that the first cell is to be fully discharged first before the second cell.

According to a third aspect, an embodiment of this application further provides a battery management system, including at least one processor and a memory connected in communication to the at least one processor. The battery management system is connected to a battery pack. The battery pack includes a first cell without a plateau and a second cell with a plateau. At least one first cell is serially connected to the second cell. The memory stores an instruction executable by the at least one processor. The instruction is executed by the at least one processor so that the at least one processor is enabled to perform the method for estimating a SOC of a battery pack, where the method is provided in a possible implementation with reference to the embodiment of the second aspect.

According to a fourth aspect, an embodiment of this application provides a storage medium on which a computer program is stored. When executed by a processor, the computer program implements the method provided in the embodiment of the first aspect and/or provided in any one possible implementation with reference to the embodiment of the first aspect.

Other features and advantages of this application are expounded in the following specification and partly become evident from the specification, or will be understood by implementing an embodiment of this application. The objectives and other advantages of this application can be implemented and achieved through the structures specified in the specification and the drawings.

BRIEF DESCRIPTION OF DRAWINGS

To describe the technical solutions in the embodiments of this application more clearly, the following outlines the drawings used in the embodiments of this application.

Evidently, the drawings outlined below are merely a part of embodiments of this application. A person of ordinary skill in the art may derive other drawings from the outlined drawings without making any creative efforts.

DETAILED DESCRIPTION OF EMBODIMENTS

The following gives a more detailed description of implementations of this application with reference to accompanying drawings and embodiments. The detailed description of the following embodiments and the accompanying drawings are intended to exemplarily describe the principles of this application, but not to limit the scope of this application. Therefore, this application is not limited to the described embodiments.

A method for estimating a SOC of a battery pack according to an embodiment of this application is applicable to an electric vehicle. The method can implement estimation of the SOC of the battery pack of an electric vehicle. Further, the method is applicable to other electric devices, that is, devices that use a battery or a battery pack as a power supply. The method can implement estimation of the SOC of the battery pack of other electric devices.

The electric vehicle and other electric devices are usually equipped with a battery management system (BMS). The BMS and the battery pack constitute a battery system. The BMS is configured to manage various parameters such as voltage, current, temperature of the battery pack. A hardware environment in which the embodiment of this application is applied may be a BMS corresponding to the battery pack. The BMS is connected to the battery pack to manage the battery pack, and is also connected to other modules of the electric vehicle or the electric devices, where the connecting may be electrical connection, physical connection, and other workable connection relationships. Data can be transmitted between the BMS and such modules. For example, the BMS of the electric vehicle sends relevant parameter information of the battery pack to a central control system. The central control system feeds back the relevant parameter information, for example, displays the parameter information directly. For another example, the BMS receives a relevant instruction sent by the central control system, and the BMS manages the battery pack accordingly based on the instruction.

Figure 1:
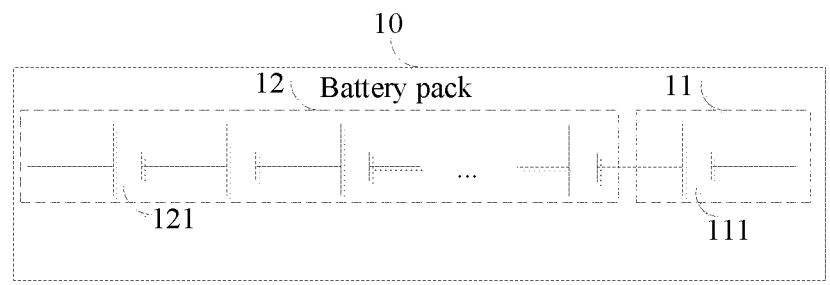
FIG. 1 shows a schematic structural diagram of a battery pack according to an embodiment of this application.

FIG. 1 shows an example of a battery pack 10 according to this application. The battery pack 10 includes two different types of cells. One type of cell is a first cell 11 without a plateau, and the other type of cell is a second cell 12 with a plateau. At least one first cell 11 is serially connected to the second cell 12 in the battery pack 10. The first cell 11 may include one single cell 111. The second cell 12 may include a plurality of single cells 121. The plurality of single cells 121 are serially connected to each other.

A state-of-charge open circuit voltage curve (SOC-OCV curve) of the first cell 11 is different from the state-of-charge open circuit voltage curve (SOC-OCV curve) of the second cell 12, where the SOC-OCV curve is a variation curve of an open circuit voltage of the cell in relation to a state of charge. The first cell 11 is a cell without a plateau, and may be a ternary cell (also called an NCM cell, where NCM is an acronym of nickel (Ni), cobalt (Co), and manganese (Mn)). The ternary cell is a cell with a positive electrode material that is primarily made from nickel (Ni), cobalt (Co), and manganese (Mn). A ratio between nickel, cobalt, and manganese may be adjusted as required. The second cell 12 is a cell with a plateau, and may be a lithium iron phosphate cell denoted by a chemical formula of $LiFePO_4$, briefly known as an LFP cell.

Figure 2:
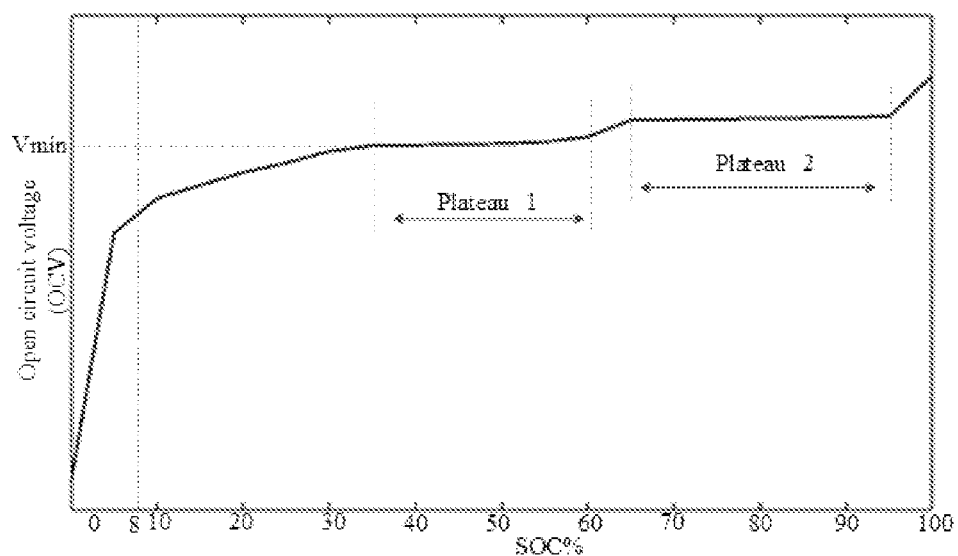
FIG. 2 shows a schematic diagram of a SOC-OCV curve of an LFP cell according to an embodiment of this application.
Figure 3:
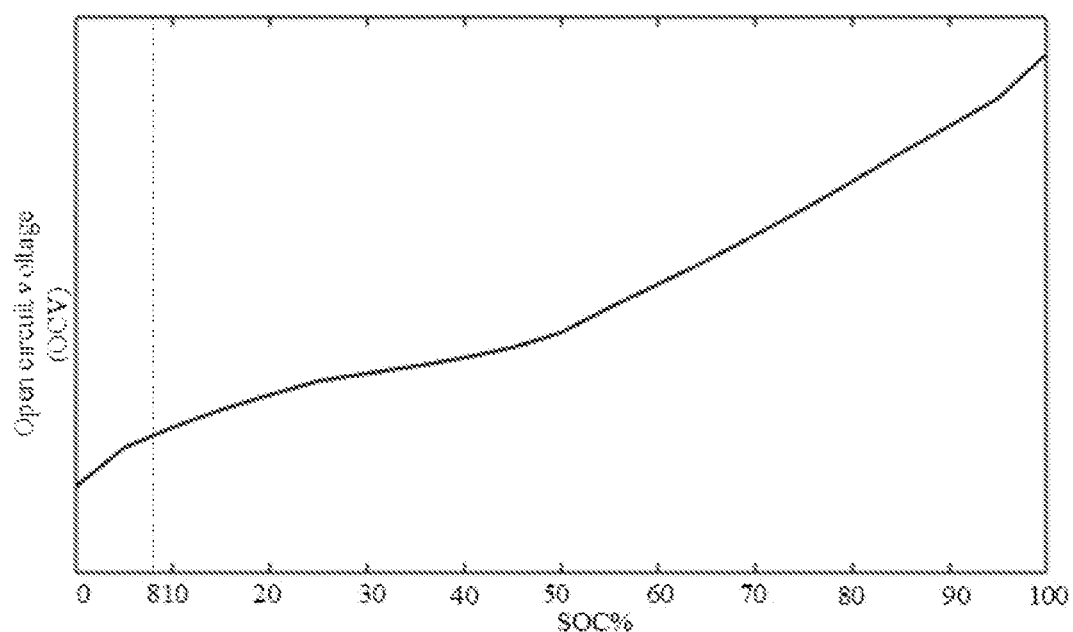
FIG. 3 shows a schematic diagram of a SOC-OCV curve of an NCM cell according to an embodiment of this application.

The following exemplifies the difference in the SOC-OCV curve between the two different types of cells. It is assumed that the first cell 11 is an NCM cell, and the second cell 12 is an LFP cell. The SOC-OCV curve of the LFP cell is shown in FIG. 2, and the SOC-OCV curve of the NCM cell is shown in FIG. 3. As can be seen from FIG. 2, plateaus exist in the SOC-OCV curve of the LFP cell: a plateau 1 and a plateau 2. For the curve part corresponding to the plateau 1 and the plateau 2, the voltage basically keeps unchanged. That is, the voltage in the plateau little varies. For example, a voltage variation corresponding to each 1% of SOC variation is less than 1 mV.

As can be seen from comparison between FIG. 2 and FIG. 3, a slope of the SOC-OCV curve of the LFP cell is greater than a slope of the SOC-OCV curve of the ternary cell when the state of charge is 0% to 8%, but the slope of the SOC-OCV curve of the LFP cell is less than the slope of the SOC-OCV curve of the ternary cell when the state of charge is approximately 8% to 95%. The SOC-OCV curve of the LFP cell takes on a trend of a steep rise followed by a smooth rise. The SOC-OCV curve of the ternary cell takes on a gradual rise trend.

In the prior art, the SOC is usually estimated based on a voltage value and the SOC-OCV curve. For a cell with a plateau, the voltage variation corresponding to each 1% of SOC variation is less than 1 mV. This may lead to a SOC estimation error of 5% or above, so that the accuracy of the SOC estimation is not high. In view of the foregoing, in this embodiment of this application, the first cell without a plateau is introduced, and the first cell is serially connected to the second cell with a plateau, so that the accuracy of the SOC estimation can be improved by using the method for estimating a SOC of a battery pack according to the embodiment of this application.

Figure 4:
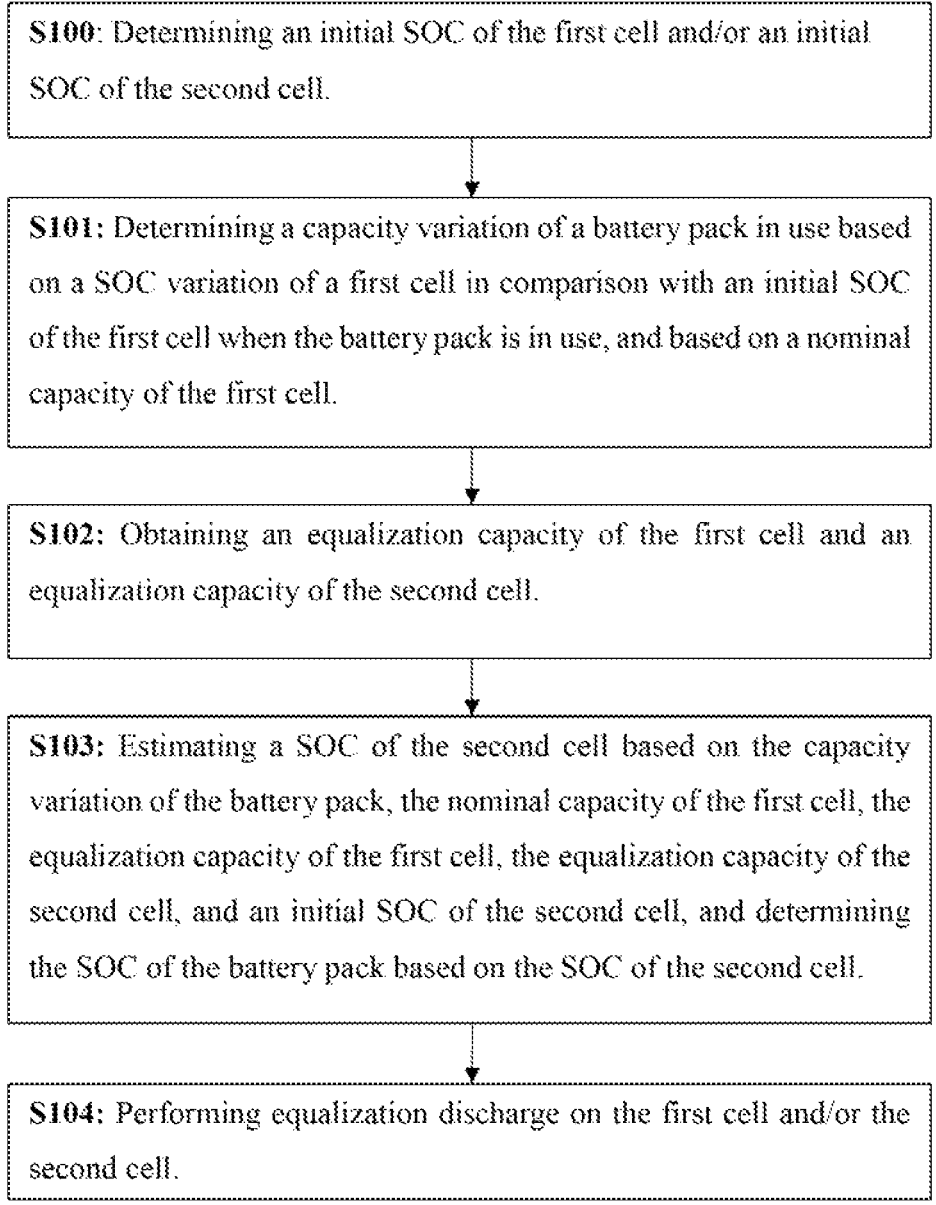
FIG. 4 shows a schematic flowchart of a method for estimating a SOC of a battery pack according to an embodiment of this application.

The following describes a method for estimating a SOC of a battery pack according to an embodiment of this application with reference to FIG. 4. The method includes the following steps.

Step S100: Determining an initial SOC of the first cell and/or an initial SOC of the second cell. This step will be described later.

Step S101: Determining a capacity variation of a battery pack in use based on a SOC variation of a first cell in comparison with an initial SOC of the first cell when the battery pack is in use, and based on a nominal capacity of the first cell.

In step S101, the battery pack "in use" covers possible circumstances of the battery pack in use, for example, the battery pack is installed in an electric vehicle, and the SOC changes when the electric vehicle is being charged, moving, or standing statically. For ease of understanding, the SOC variation of the first cell in comparison with the initial SOC of the first cell is represented by ($SOC_B$−$SOC_{B\_initial}$), and the nominal capacity of the first cell is represented by $C_B$. Therefore, the capacity variation of the battery pack in use may be represented by $\Delta Cap=(SOC_B-SOC_{B\_initial}) \times C_B$. $SOC_B$ is the SOC of the first cell that is obtained when the SOC of the battery pack needs to be estimated, and $SOC_{B\_initial}$ is the initial SOC of the first cell. The nominal capacity of the first cell is a capacity marked before the first cell is shipped from a factory, and is a preset known value.

The SOC variation of the first cell in use can be obtained based on the SOC of the first cell in use, that is, $SOC_B$, and based on the initial SOC of the first cell, that is, $SOC_{B\_initial}$.

In an implementation, in obtaining the SOC of the first cell, a battery management system obtains a current SOC of the first cell when a preset time interval of estimating the SOC (for example, but without limitation, 1 minute) has elapsed, or when a trigger condition is satisfied, for example, when the battery management system receives a battery pack SOC estimation instruction sent by another module such as a central control system.

The method for obtaining the current SOC of the first cell is the same as the method for obtaining a SOC of a battery pack containing merely one cell in the prior art. The SOC of the first cell may be determined based on a nonlinear Kalman filtering method. In addition, the currently obtained SOC of the first cell is corrected based on a static voltage and the SOC-OCV curve of the first cell in a static standing state (a state in which no current flows), and based on an open circuit voltage and the SOC-OCV curve of the first cell carrying a current, so as to obtain a final SOC of the first cell, that is, $SOC_B$. This process is already well known to those skilled in the art, details of which are omitted herein.

Step S100 is that, in an implementation, in obtaining the initial SOC of the first cell, it may be determined whether the open circuit voltage of the second cell is currently located in the plateau of the SOC-OCV curve of the second cell. If the open circuit voltage of the second cell is currently located in the plateau of the SOC-OCV curve of the second cell, $SOC_{B\_initial}$ is the initial SOC of the first cell that is obtained and stored when the open circuit voltage of the second cell is previously not located in the plateau of the SOC-OCV curve; or, if the open circuit voltage of the second cell is currently not located in the plateau of the SOC-OCV curve of the second cell, $SOC_{B\_initial}$ is the latest initial SOC obtained currently. If there is no such initial SOC of the first cell that is obtained and stored when the open circuit voltage of the second cell is previously not located in the plateau of the SOC-OCV curve, the initial SOC of the first cell is a default initial SOC of the system. It needs to be noted that from the very beginning, a default initial SOC of the first cell is set in the system. In estimating the SOC of the battery pack for the first time, if the open circuit voltage of the second cell is located in the plateau of the SOC-OCV curve of the second cell, the initial SOC of the first cell is the default initial SOC of the system.

For ease of understanding, an example is given here. At a moment 1 (clock 1), when the open circuit voltage of the second cell is not located in the plateau of the SOC-OCV curve of the second cell, the initial SOC of the first cell is obtained and stored. At a moment 2 (clock 2), when the SOC of the battery pack needs to be estimated, it is determined whether the open circuit voltage of the second cell is currently located in the plateau of the SOC-OCV curve of the second cell. If the open circuit voltage of the second cell is currently not located in the plateau of the SOC-OCV curve of the second cell, the initial SOC of the first cell at this moment is obtained again, and the stored SOC of the first cell is updated. At this moment, $SOC_{B\_initial}$ is the latest initial SOC obtained currently. If the open circuit voltage of the second cell is currently located in the plateau of the SOC-OCV curve of the second cell, $SOC_{B\_initial}$ is the initial SOC of the first cell obtained and stored at the moment of clock 1. It needs to be noted that the initial SOC of the first cell is updated in real time. As long as the open circuit voltage of the second cell is not located in the plateau of the SOC-OCV curve of the second cell, the initial SOC of the first cell is updated.

In a possible implementation, the process of obtaining the initial SOC of the first cell may be: if it is detected that the second cell is in a fully charged state, the SOC of the first cell is obtained as the initial SOC of the first cell, that is, when the second cell is in a fully charged state, the read SOC of the first cell is directly used as the initial SOC of the first cell without a need to obtain a sampled voltage of the first cell; or, if it is detected that the second cell is in a low-end static standing state, a sampled voltage of the first cell is obtained, and the initial SOC of the first cell is obtained based on the SOC-OCV curve of the first cell. It needs to be noted that as long as the second cell is detected to be in a fully charged state, or as long as the second cell is detected to be in a low-end static standing state, the initial SOC of the first cell is updated.

If the second cell includes a plurality of single cells, that is, two or more single cells, the second cell is deemed to be in a fully charged state as long as any single cell of the second cells is detected to be in a fully charged state; and the second cell is not deemed to be in a low-end static standing state until all the single cells of the second cells are in a low-end static standing state.

Optionally, "not located in the plateau of the SOC-OCV curve of the second cell" means that the second cell is in a fully charged state, or the second cell is in a low-end static standing state.

The fully charged state is a state in which the SOC of the cell reaches a preset maximum value such as 100% in a charging process. The low-end static standing state is a state in which the voltage value of the second cell is not greater than (that is, less than or equal to) a minimum voltage value (such as Vmin in FIG. 2) corresponding to the plateau of the SOC-OCV curve, and in which the second cell is in a static standing state.

If the first cell includes a plurality of single cells, that is, two or more single cells, optionally, a single cell with the lowest voltage in the static standing process may be selected from the plurality of single cells of the first cells to perform calculation. That is, all of the initial SOC of the first cell, the SOC of the first cell, and the SOC variation of the first cell are corresponding parameters of the selected cell. It needs to be noted that the practice of selecting the single cell with the lowest voltage in the static standing process is an exemplary solution of this application. Theoretically, any cell among the plurality of single cells may be selected. Therefore, the exemplary solution in which the single cell with the lowest voltage in the static standing process is selected for calculation is not to be understood as a limitation on this application.

In an optional implementation, considering that the battery suffers loss or aging during use, the actually stored capacity of the cell is less than a nominal capacity. Therefore, to improve the precision of estimating the SOC in this embodiment of this application, a state of health (SOH) of the cell is also taken into account in estimating the SOC of the battery pack.

In an optional implementation, a process of determining a capacity variation of the battery pack in use based on a SOC variation of the first cell in comparison with an initial SOC of the first cell, and based on a nominal capacity of the first cell includes: determining the capacity variation of the battery pack in use based on the SOC variation of the first cell in comparison with the initial SOC of the first cell when the battery pack is in use, and based on the nominal capacity of the first cell, and the SOH of the first cell, as expressed by a formula: $\Delta Cap=(SOC_B-SOC_{B\_initial}) \times C_B \times SOH_B$. $SOH_B$ is the state of health of the first cell.

Step S102: Obtaining an equalization capacity of the first cell and an equalization capacity of a second cell.

In step S102, in order to obtain the equalization capacity in real time, the equalization capacity of each type of cell can be obtained by an ampere-hour integral method based on an equalization time and an equalization current, that is, by calculating the integral of the equalization current with respect to the equalization time. Whenever the first cell is updated, the equalization capacities of the first cell and the second cell are automatically reset to zero.

The equalization current may be calculated with the formula: $I=U/R$ at the start of the equalization based on a passive equalization resistance and the voltage of the cell at the time of the equalization. The passive equalization resistance is a known value. The voltage of the cell at the time of equalization may be obtained by the BMS by sampling. The equalization time may be obtained by counting. The counting of the equalization time starts at the start of the equalization, thereby obtaining the equalization time t.

If the first cell includes a plurality of single cells, the equalization capacity of the first cell may be the equalization capacity of the single cell selected from the plurality of single cells of the first cell. In obtaining the equalization capacity of the first cell, the equalization capacity of the first cell can be obtained by just determining the equalization time and the equalization current of the selected single cell.

If the second cell includes a plurality of single cells, in obtaining the equalization capacity of the second cell, it is necessary to determine the equalization time and the equalization current of each of the single cells of the second cell, so as to obtain the equalization capacity of each of the plurality of single cells.

In an optional implementation, in equalizing the first cell and the second cell, if the first cell is to be fully discharged first before the second cell, equalization discharge is performed on the second cell in an amount equal to the equalization capacity of the second cell, so as to ensure that the second cell is fully discharged first. If the first cell is to be fully charged first before the second cell, equalization discharge is performed on the first cell in an amount equal to the equalization capacity of the first cell, so as to ensure that the second cell is fully charged first. During the equalization discharge, the cell that needs to be discharged may be discharged by using a passive equalization resistor, which is well known to those skilled in the art and not detailed herein.

In an optional implementation, a process of determining that the first cell is to be fully discharged or charged first before the second cell includes: determining, based on the initial SOC, the nominal capacity, and an SOH of the first cell, a charge capacity required for fully charging the first cell or a discharge capacity required for fully discharging the first cell; determining, based on the initial SOC, a nominal capacity, and an SOH of the second cell, a charge capacity required for fully charging the second cell or a discharge capacity required for fully discharging the second cell; comparing the charge capacity required for fully charging the first cell with the charge capacity required for fully charging the second cell, and determining, if the charge capacity of the first cell is less than the charge capacity of the second cell, that the first cell is to be fully charged first before the second cell; comparing the discharge capacity required for fully discharging the first cell with the discharge capacity required for fully discharging the second cell, and determining, if the discharge capacity of the first cell is less than the discharge capacity of the second cell, that the first cell is to be fully discharged first before the second cell.

For ease of understanding, a letter B represents the first cell, a letter A represents the second cell. Therefore, the charge capacity required for fully charging the first cell may be represented by $(1-SOC_B) \times C_B \times SOH_B$; the charge capacity required for fully charging the second cell may be represented by $(1-SOC_A) \times C_A \times SOH_A$; the discharge capacity required for fully discharging the first cell may be represented by $SOC_B \times C_B \times SOH_B$; and the discharge capacity required for fully discharging the second cell may be represented by $SOC_A \times C_A \times SOH_A$. $C_A$ is the nominal capacity of the second cell, which is a capacity marked before the second cell is shipped from a factory, and is a preset known value. $SOH_A$ is the state of health (SOH) of the second cell, and $SOH_B$ is the state of health of the first cell.

"Fully charged first" means that the first cell chronologically reaches a fully charged state first before the second cell, or the second cell chronologically reaches a fully charged state first before the first cell. "Fully discharged first" means that the first cell chronologically reaches a fully discharged state first before the second cell, or the second cell chronologically reaches a fully discharged state first before the first cell.

The fully discharged state is a state in which the SOC of the cell reaches a preset minimum value, for example but without limitation, 5%. For example, when the SOC of a cell in a discharging process is lower than 5%, the cell stops discharging and reaches a fully discharged state.

Step S103: Estimating a SOC of the second cell based on the capacity variation of the battery pack, the nominal capacity of the first cell, the equalization capacity of the first cell, the equalization capacity of the second cell, and an initial SOC of the second cell, and determining a SOC of the battery pack based on the SOC of the second cell.

In step S103, for ease of understanding, the capacity variation of the battery pack is represented by $\Delta Cap$, the nominal capacity of the first cell is represented by $C_B$, the equalization capacity of the first cell is represented by $C_b$, the equalization capacity of the second cell is represented by $C_a$, the initial SOC of the second cell is represented by $SOC_{A\_initial}$, and the SOC of the second cell is represented by $SOC_A$. Therefore, $$SOC_A = \frac{\Delta Cap - C_a - C_b}{C_B} + SOC_{A\_initial}.$$

In obtaining the initial SOC of the second cell, it is determined whether the open circuit voltage of the second cell is currently located in the plateau of the SOC-OCV curve of the second cell. If the open circuit voltage of the second cell is currently located in the plateau of the SOC-OCV curve, the initial SOC of the second cell is the initial SOC of the second cell that is obtained and stored when the open circuit voltage of the second cell is previously not located in the plateau of the SOC-OCV curve; or, if the open circuit voltage of the second cell is currently not located in the plateau of the SOC-OCV curve, the initial SOC of the second cell is the latest initial SOC obtained currently. If there is no such initial SOC of the second cell that is obtained and stored when the open circuit voltage of the second cell is previously not located in the plateau of the SOC-OCV curve, the initial SOC of the second cell is a default initial SOC of the system. It needs to be noted that from the very beginning, a default initial SOC of the second cell is set in the system. In estimating the SOC of the battery pack for the first time, if the open circuit voltage of the second cell is located in the plateau of the SOC-OCV curve of the second cell, the initial SOC of the second cell is the default initial SOC of the system.

Step S104: In a possible implementation, the method further includes: performing, if the first cell is to be fully discharged first before the second cell, equalization discharge on the second cell to ensure that the second cell is fully discharged first; and performing, if the first cell is to be fully charged first before the second cell, equalization discharge on the first cell to ensure that the second cell is fully charged first.

For ease of understanding, an example is given here. At a moment 1 (clock 1), when the open circuit voltage of the second cell is not located in the plateau of the SOC-OCV curve of the second cell, the initial SOC of the second cell is obtained and stored. At a moment 2 (clock 2), when the SOC of the battery pack needs to be estimated, it is determined whether the open circuit voltage of the second cell is currently located in the plateau of the SOC-OCV curve of the second cell. If the open circuit voltage of the second cell is currently not located in the plateau of the SOC-OCV curve of the second cell, the initial SOC of the second cell at this moment is obtained again, and the stored initial SOC of the second cell is updated. At this moment, $SOC_{A\_initial}$ is the latest initial SOC obtained currently. If the open circuit voltage of the second cell is currently located in the plateau of the SOC-OCV curve of the second cell, $SOC_{A\_initial}$ is the initial SOC of the second cell obtained and stored at the moment of clock 1. It needs to be noted that the initial SOC of the second cell is updated in real time. As long as the open circuit voltage of the second cell is not located in the plateau of the SOC-OCV curve of the second cell, the initial SOC of the second cell is updated. In an implementation, a process of obtaining the initial SOC of the second cell may be: if it is detected that the second cell is in a fully charged state, the initial SOC of the second cell is obtained; or, if it is detected that the second cell is in a low-end static standing state, a sampled voltage of the second cell is obtained, and the initial SOC of the second cell is obtained based on the SOC-OCV curve of the second cell. It needs to be noted that as long as the second cell is detected to be in a fully charged state, or as long as the second cell is detected to be in a low-end static standing state, the initial SOC of the second cell is updated.

If the second cell is a single cell, that is, the second cell includes just one single cell, and when it is detected that the second cell is in a fully charged state, the initial SOC of the second cell is 100%. If the second cell includes a plurality of single cells, that is, when the second cell includes two or more single cells, the initial SOC of the second cell is an array, and the array includes the initial SOCs of all single cells. When it is detected that a single cell of the second cell is in a fully charged state, the SOC of the single cell in the fully charged state is corrected to 100%, that is, the initial SOC of all single cells in the fully charged state is 100%; and the SOCs of remaining single cells that are not in a fully charged state are corrected in the same amount. The corrected SOCs serve as the initial SOC of the single cells that are not in the fully charged state. When the second cell is in a low-end static standing state, the initial SOC of each single cell of the second cell is the initial SOC that is obtained based on the sampled voltage of the single cell and the SOC-OCV curve of the second cell.

For ease of understanding, an example is given in which the second cell includes 3 single cells. The 3 single cells are a single cell 1, a single cell 2, and a single cell 3. It is assumed that the single cell 1 is detected to be in a fully charged state, and the actual SOC of the single cell 1 at this moment is 98%. Therefore, the initial SOC of the single cell 1 is corrected to 100% in an increment of 2%. The remaining single cells that are not in a fully charged state are corrected in the same amount. That is, the SOC of the single cells that are not in a fully charged state is increased by 2%. For the single cell 2, if the actual SOC of the single cell 2 at this moment is 97%, the corrected SOC of the single cell 2 is 99%. Similarly, for the single cell 3, if the actual SOC of the single cell 3 at this moment is 96%, the corrected SOC of the single cell 3 is 98%. When the second cell is in a low-end static standing state, the initial SOC of the single cell 1 is the initial SOC obtained based on the sampled voltage of the single cell 1 and the SOC-OCV curve of the second cell; the initial SOC of the single cell 2 is the initial SOC obtained based on the sampled voltage of the single cell 2 and the SOC-OCV curve of the second cell; and the initial SOC of the single cell 3 is the initial SOC obtained based on the sampled voltage of the single cell 3 and the SOC-OCV curve of the second cell. It needs to be noted that the foregoing examples are merely intended for ease of understanding, but not intended as a limitation on this application.

In an optional implementation, considering that the battery suffers loss or aging during use, the actually stored capacity of the cell is less than a nominal capacity. Therefore, to improve the precision of estimating the SOC in this embodiment of this application, a state of health of the cell is also taken into account in estimating the SOC of the battery pack.

In an optional implementation, a process of estimating a SOC of the second cell based on the capacity variation of the battery pack, the nominal capacity of the first cell, the equalization capacity of the first cell, the equalization capacity of the second cell, and an initial SOC of the second cell includes: estimating the SOC of the second cell based on the capacity variation of the battery pack, the nominal capacity of the first cell, the equalization capacity of the first cell, the SOH of the first cell, the equalization capacity of the second cell, and the initial SOC of the second cell, as expressed by a formula:

$$SOC_A = \frac{\Delta\text{Cap} - C_a - C_b}{C_B \times SOH_B} + SOC_{A\_initial}.$$

If the second cell includes a plurality of single cells, that is, when the second cell includes two or more single cells, the estimation needs to be performed on each of the plurality of single cells in estimating the SOC of the second cell.

In equalizing the first cell and the second cell, if the first cell is to be fully discharged first before the second cell, the equalization discharge is performed on the second cell to ensure that the second cell is fully discharged first; and, if the first cell is to be fully charged first before the second cell, the equalization discharge is performed on the first cell to ensure that the second cell is fully charged first, thereby preventing the first cell from affecting the charge and discharge of the entire battery pack and from becoming a cell that bottlenecks the exertion of the capacity of the battery pack. The charge and discharge of the entire battery pack merely depend on the charge and discharge of the second cell, so that the SOC of the second cell can reflect the SOC of the entire battery pack. Therefore, in estimating the SOC of the battery pack, it is enough to estimate just the SOC of the second cell. After the SOC of the second cell is obtained, the SOC of the battery pack can be determined based on the SOC of the second cell.

If the second cell is a single cell, after the SOC of the second cell is obtained, the SOC of the second cell can be used as the SOC of the battery pack. If the second cell includes a plurality of single cells, that is, when the second cell includes two or more single cells, the SOC of the second cell is an array, and the array includes the SOCs of all the single cells. Therefore, a process of determining the SOC of the battery pack based on the SOC of the second cell may be: obtaining a maximum SOC and a minimum SOC from the plurality of SOCs of the second cell; and obtaining a weighted SOC of the maximum SOC and the minimum SOC, and using the weighted SOC as the SOC of the battery pack. For ease of understanding, the maximum SOC is represented by SOC_max, the minimum SOC is represented by SOC_min, and the SOC of the battery pack is represented by SOC_pack. A practicable formula for calculating the weighted SOC is: SOC_pack=SOC_min/(1−(SOC_max−SOC_min))×100%.

In this embodiment of this application, the first cell without a plateau is introduced, and the first cell is serially connected to the second cell with a plateau. In this way, the capacity variation of the battery pack in use can be determined based on the SOC variation of the first cell in comparison with the initial SOC of the first cell when the battery pack is in use, and based on the nominal capacity of the first cell. Then the equalization capacity of the first cell and the equalization capacity of the second cell are obtained. Finally, the SOC of the second cell can be estimated precisely based on the capacity variation of the battery pack, the nominal capacity of the first cell, the equalization capacity of the first cell, the equalization capacity of the second cell, and the initial SOC of the second cell, thereby solving the problem of low accuracy of estimating the SOC based on a voltage value and a SOC-OCV curve in the prior art when the cell has a plateau.

Figure 5:
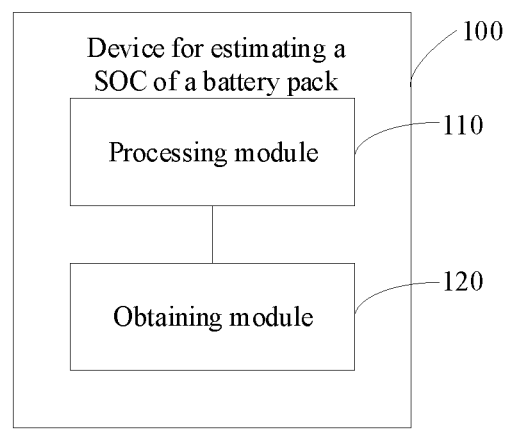
FIG. 5 shows a modular block diagram of a device for estimating a SOC of a battery pack according to an embodiment of this application.

Based on the same inventive concept, referring to FIG. 5, an embodiment of this application further provides a device 100 for estimating a SOC of a battery pack. The device 100 for estimating a SOC of a battery pack includes a processing module 110 and an obtaining module 120.

The processing module 110 is configured to determine a capacity variation of a battery pack in use based on a SOC variation of a first cell in comparison with an initial SOC of the first cell when the battery pack is in use, and based on a nominal capacity of the first cell.

The obtaining module 120 is configured to obtain an equalization capacity of the first cell and an equalization capacity of the second cell.

The processing module 110 is further configured to estimate a SOC of the second cell based on the capacity variation of the battery pack, the nominal capacity of the first cell, the equalization capacity of the first cell, the equalization capacity of the second cell, and an initial SOC of the second cell, and determine a SOC of the battery pack based on the SOC of the second cell.

In this embodiment of this application, the processing module 110 is specifically configured to determine a capacity variation of a battery pack in use based on a SOC variation of a first cell in comparison with an initial SOC of the first cell when the battery pack is in use, and based on a nominal capacity of the first cell and an SOH of the first cell.

In this embodiment of this application, the processing module 110 is specifically configured to: estimate the SOC of the second cell based on the capacity variation of the battery pack, the nominal capacity of the first cell, the equalization capacity of the first cell, the SOH of the first cell, the equalization capacity of the second cell, and the initial SOC of the second cell.

In this embodiment of this application, the processing module 110 is further configured to: obtain the SOC variation of the first cell in use based on the SOC of the first cell in use and the initial SOC of the first cell, where, if an open circuit voltage of the second cell is currently located in a plateau of a SOC-OCV curve of the second cell, the initial SOC is an initial SOC of the first cell that is obtained and stored when the open circuit voltage of the second cell is previously not located in the plateau of the SOC-OCV curve of the second cell; or, if an open circuit voltage of the second cell is currently not located in a plateau of a SOC-OCV curve of the second cell, the initial SOC is a latest initial SOC obtained currently.

In this embodiment of this application, if an open circuit voltage of the second cell is currently located in a plateau of a SOC-OCV curve of the second cell, the initial SOC of the second cell is an initial SOC of the second cell that is obtained and stored when the open circuit voltage of the second cell is previously not located in the plateau of the SOC-OCV curve of the second cell; or, if an open circuit voltage of the second cell is currently not located in a plateau of a SOC-OCV curve of the second cell, the initial SOC of the second cell is a latest initial SOC obtained currently.

In this embodiment of this application, the processing module 110 is further configured to: obtain, when it is detected that the second cell is in a fully charged state, the initial SOC of the second cell, obtain a SOC in which the first cell is located when the second cell is in the fully charged state, and use the obtained SOC as the initial SOC of the first cell; or, obtain, when it is detected that the second cell is in a low-end static standing state, a sampled voltage of the first cell, and obtain the initial SOC of the first cell based on a SOC-OCV curve of the first cell, obtain a sampled voltage of the second cell, and obtain the initial SOC of the second cell based on a SOC-OCV curve of the second cell.

In this embodiment of this application, the second cell includes a plurality of single cells, and the processing module 110 is further configured to: obtain a maximum SOC and a minimum SOC from a plurality of SOCs of the second cell, where each single cell corresponds to one SOC; and obtain a weighted SOC of the maximum SOC and the minimum SOC, and use the weighted SOC as the SOC of the battery pack.

In this embodiment of this application, the device 100 for estimating a SOC of a battery pack further includes an equalization module. The equalization module is configured to: perform, if the first cell is to be fully discharged first before the second cell, equalization discharge on the second cell to ensure that the second cell is fully discharged first; and perform, if the first cell is to be fully charged first before the second cell, equalization discharge on the first cell to ensure that the second cell is fully charged first.

In this embodiment of this application, the equalization module is further configured to: determine, based on the initial SOC, the nominal capacity, and an SOH of the first cell, a charge capacity required for fully charging the first cell or a discharge capacity required for fully discharging the first cell; determine, based on the initial SOC, a nominal capacity, and an SOH of the second cell, a charge capacity required for fully charging the second cell or a discharge capacity required for fully discharging the second cell; determine, if the charge capacity of the first cell is less than the charge capacity of the second cell, that the first cell is to be fully charged first before the second cell; and, determine, if the discharge capacity of the first cell is less than the discharge capacity of the second cell, that the first cell is to be fully discharged first before the second cell.

The implementation principles and technical effects of the device 100 for estimating a SOC of a battery pack according to this embodiment of this application are the same as those described in the foregoing method embodiment. For brevity, the content not mentioned in the device embodiment may be obtained by referring to the corresponding content in the method embodiment.

Figure 6:
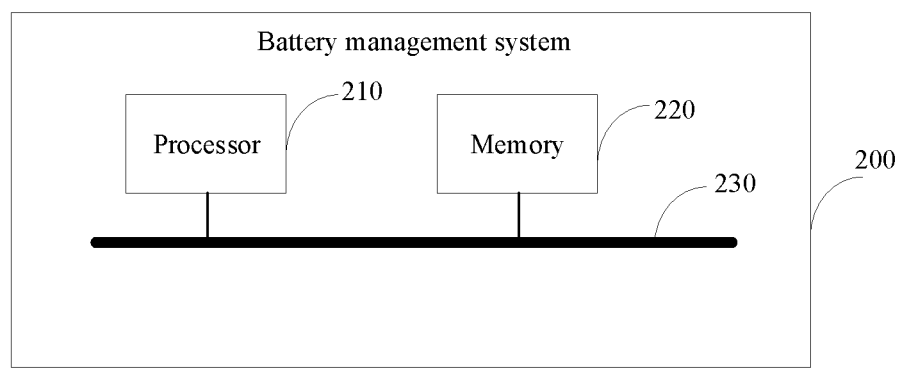
FIG. 6 shows a schematic structural diagram of a battery management system according to an embodiment of this application.

Based on the same inventive concept, as shown in FIG. 6, FIG. 6 shows a structural block diagram of a battery management system 200 according to an embodiment of this application. The battery management system 200 includes a processor 210 and a memory 220 connected in communication to the processor 210. The memory 220 stores an instruction executable by the processor. The instruction is executed by the processor 210 so that the processor 210 is enabled to perform the method for estimating a SOC of a battery pack according to an embodiment of this application.

The processor 210 is electrically connected to the memory 220 directly or indirectly to transmit or exchange data. For example, such components may be electrically connected to each other by one or more communications buses 530 or signal buses 530. The method for estimating a SOC of a battery pack includes at least one software function module that can be stored in the memory 220 in the form of software or firmware.

The processor 210 may be an integrated circuit chip capable of processing signals. The processor 210 may be a general-purpose processor, such as a CPU (central processing unit, central processing unit) or an NP (network processor, network processor); or may be a digital signal processor, an application-specific integrated circuit, a field programmable gate array or other programmable logical device, a discrete gate or a transistor logical device, or a discrete hardware component. The processor can implement or perform the methods, steps, and logical block diagrams disclosed in any embodiment of this application. The general-purpose processor may be a microprocessor, or the processor may be any conventional processor or the like.

The memory 220 may store various software programs and modules, such as program instructions or modules corresponding to the method and device for estimating a SOC of a battery pack according to the embodiments of this application. By running the software programs and modules stored in the memory 220, the processor 210 performs various functionalities and data processing, that is, implements the method according to the embodiments of this application.

The memory 220 may be, but is not limited to, a random access memory (RAM), a read-only memory (ROM), a programmable read-only memory (PROM), an erasable programmable read-only memory (EPROM), an electric erasable programmable read-only memory (EEPROM), or the like.

The various implementations and specific examples described in the method for estimating a SOC of a battery pack in the foregoing embodiments are also applicable to the battery management system 500 shown in FIG. 6. From the foregoing detailed description of the method for estimating a SOC of a battery pack, a person skilled in the art clearly learns the implementation method of the battery management system 500 shown in FIG. 6. Therefore, for brevity, the details of the implementation method are omitted here.

Based on the same inventive concept, an embodiment of this application further provides a vehicle. The vehicle is an electric vehicle, and the vehicle includes the battery pack 10 shown in FIG. 1 and the battery management system 200 shown in FIG. 6.

Based on the same inventive concept, an embodiment of this application further provides an electric device. The electric vehicle includes the battery pack 10 shown in FIG. 1 and the battery management system 200 shown in FIG. 6.

Based on the same inventive concept, an embodiment of this application further provides a non-volatile computer-readable storage medium (hereinafter referred to as "storage medium"). The storage medium stores a computer program. When executed by a computer such as the battery management system 200, the computer program performs the ring network configuration method. The storage medium includes any medium capable of storing program code, for example, a USB flash disk, a removable hard disk, a read-only memory (ROM), a random access memory (RAM), a magnetic disk, or an optical disk.

It needs to be noted that the embodiments in this specification are all described in a progressive manner, and each embodiment focuses on differences from other embodiments. For the same or similar content in one embodiment, reference may be made to another embodiment.

It needs to be noted that the relational terms used in this application such as "first" and "second" are merely intended to differentiate one entity or operation from another, but do not necessarily require or imply any actual relationship or sequence between the entities or operations. Moreover, the terms "include", "comprise", and any variation thereof are intended to cover a non-exclusive inclusion relationship in which a process, method, object, or device that includes or comprises a series of elements not only includes such elements, but also includes other elements not expressly specified or also includes inherent elements of the process, method, object, or device. Unless otherwise specified in the context, reference to a process, method, object, or device that "includes" or "comprises" a specific number of elements does not exclude other identical or equivalent elements existent in the process, method, object, or device.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application is subject to the protection scope of the claims.

Although this application has been described with reference to exemplary embodiments, various improvements may be made to the embodiments without departing from the scope of this application, and the parts therein may be replaced with equivalents. Particularly, to the extent that no structural conflict exists, various technical features mentioned in various embodiments can be combined in any manner. This application is not limited to the specific embodiments disclosed herein, but includes all technical solutions falling within the scope of the claims.

What is claimed is:

1. A method for estimating a state of charge (SOC) of a battery pack in use, performed by a battery management system that comprises a memory and a processor, wherein the battery pack comprises a first cell whose state of charge-open circuit voltage (SOC-OCV) curve does not have a plateau and a second cell whose SOC-OCV curve has at least one plateau, and the first cell is serially connected to the second cell, wherein the method comprises:
   determining a capacity variation of the battery pack based on a SOC variation of the first cell in comparison with an initial SOC of the first cell and based on a nominal capacity of the first cell;
   obtaining an equalization capacity of the first cell and an equalization capacity of the second cell, each equalization capacity being obtained by calculating an integral of an equalization current with respect to an equalization time;
   estimating a SOC of the second cell based on the capacity variation of the battery pack, the nominal capacity of the first cell, the equalization capacity of the first cell, the equalization capacity of the second cell, and an initial SOC of the second cell;
   determining the SOC of the battery pack based on the SOC of the second cell;
   when the first cell is to be fully discharged first before the second cell, performing an equalization discharge on the second cell to ensure that the second cell is fully discharged first; and
   when the first cell is to be fully charged first before the second cell, performing an equalization discharge on the first cell to ensure that the second cell is fully charged first.

2. The method according to claim 1, wherein determining the capacity variation of the battery pack based on the SOC variation of the first cell in comparison with the initial SOC of the first cell and based on the nominal capacity of the first cell comprises:
   determining the capacity variation of the battery pack based on the SOC variation of the first cell, the nominal capacity of the first cell, and a state of health (SOH) of the first cell.

3. The method according to claim 2, wherein estimating the SOC of the second cell based on the capacity variation of the battery pack, the nominal capacity of the first cell, the equalization capacity of the first cell, the equalization capacity of the second cell, and the initial SOC of the second cell comprises:
   estimating the SOC of the second cell based on the capacity variation of the battery pack, the nominal capacity of the first cell, the equalization capacity of the first cell, the SOH of the first cell, the equalization capacity of the second cell, and the initial SOC of the second cell.

4. The method according to claim 1, further comprising:
   obtaining a current open circuit voltage of the second cell;
   when the current open circuit voltage of the second cell is located in the plateau of the SOC-OCV curve of the second cell, determining that the initial SOC of the first cell is an initial SOC of the first cell that is obtained and stored when a previous open circuit voltage of the second cell is not located in the plateau of the SOC-OCV curve; or
   when the current open circuit voltage of the second cell is not located in the plateau of the SOC-OCV curve of the second cell, determining that the initial SOC of the first cell is a currently obtained initial SOC.

5. The method according to claim 1, further comprising:
   obtaining a current open circuit voltage of the second cell;
   when the current open circuit voltage of the second cell is located in the plateau of the SOC-OCV curve of the second cell, determining that the initial SOC of the second cell is an initial SOC of the second cell that is obtained and stored when a previous open circuit voltage of the second cell is not located in the plateau of the SOC-OCV curve of the second cell; or,
   when the current open circuit voltage of the second cell is not located in the plateau of the SOC-OCV curve of the second cell, determining that the initial SOC of the second cell is a currently obtained initial SOC.

6. The method according to claim 1, wherein the method further comprises:
   obtaining the initial SOC of the first cell and the initial SOC of the second cell, wherein obtaining the initial SOC of the first cell and the initial SOC of the second cell comprises:
   obtaining, when it is detected that the second cell is in a fully charged state, the initial SOC of the second cell, obtaining a SOC in which the first cell is located when the second cell is in the fully charged state, and using the obtained SOC as the initial SOC of the first cell; or
   obtaining, when it is detected that the second cell is in a low-end static standing state, a sampled voltage of the first cell, and obtaining the initial SOC of the first cell based on the SOC-OCV curve of the first cell, obtaining a sampled voltage of the second cell, and obtaining the initial SOC of the second cell based on the SOC-OCV curve of the second cell.

7. The method according to claim 1, wherein the second cell comprises a plurality of single cells, each single cell corresponds to one SOC, and determining the SOC of the battery pack based on the SOC of the second cell comprises:
   obtaining a maximum SOC and a minimum SOC from a plurality of SOCs of the single cells; and
   obtaining a weighted SOC based on the maximum SOC and the minimum SOC, and using the weighted SOC as the SOC of the second cell;
   wherein a SOC of a single cell is estimated based on the capacity variation of the battery pack, the nominal capacity of the first cell, the equalization capacity of the first cell, the equalization capacity of the single cell, and an initial SOC of the single cell.

8. The method according to claim 1, further comprising:
   determining a current SOC of the first cell; and
   determining the SOC variation of the first cell based on the current SOC of the first cell and the initial SOC of the first cell;
   wherein the initial SOC of the first cell is determined based on a current open circuit voltage of the second cell;
   when the current open circuit voltage of the second cell is located in the plateau of the SOC-OCV curve of the second cell, the initial SOC of the first cell is an initial SOC of the first cell that is obtained and stored when a previous open circuit voltage of the second cell is not located in the plateau of the SOC-OCV curve; or
   when the current open circuit voltage of the second cell is not located in the plateau of the SOC-OCV curve of the second cell, the initial SOC of the first cell is a currently obtained initial SOC.

9. A device for estimating a state of charge (SOC) of a battery pack in use, wherein the battery pack comprises a first cell whose open circuit voltage-state of charge (OCV-SOC) curve does not have a plateau and a second cell whose OCV-SOC curve has at least one plateau, and the first cell is serially connected to the second cell, and the device comprises:
a processor and a memory storing instructions for execution by the processor;
wherein, by executing the instructions, the processor is configured to:
determine a capacity variation of the battery pack based on a SOC variation of the first cell in comparison with an initial SOC of the first cell and based on a nominal capacity of the first cell;
obtain an equalization capacity of the first cell and an equalization capacity of the second cell, each equalization capacity being obtained by calculating an integral of an equalization current with respect to an equalization time;
estimate a SOC of the second cell based on the capacity variation of the battery pack, the nominal capacity of the first cell, the equalization capacity of the first cell, the equalization capacity of the second cell, and an initial SOC of the second cell;
determine the SOC of the battery pack based on the SOC of the second cell;
when the first cell is to be fully discharged first before the second cell, perform an equalization discharge on the second cell to ensure that the second cell is fully discharged first; and
when the first cell is to be fully charged first before the second cell, perform an equalization discharge on the first cell to ensure that the second cell is fully charged first.

10. The device according to claim 9, wherein the processor is specifically configured to:
determine the capacity variation of the battery pack based on the SOC variation of the first cell, the nominal capacity of the first cell, and a state of health (SOH) of the first cell; and
estimate the SOC of the second cell based on the capacity variation of the battery pack, the nominal capacity of the first cell, the equalization capacity of the first cell, the SOH of the first cell, the equalization capacity of the second cell, and the initial SOC of the second cell.

11. The device according to claim 9, wherein the processor is further configured to:
obtain a current open circuit voltage of the second cell;
when the current open circuit voltage of the second cell is located in the plateau of the SOC-OCV curve of the second cell, determine that the initial SOC of the first cell is an initial SOC of the first cell that is obtained and stored when a previous open circuit voltage of the second cell is not located in the plateau of the SOC-OCV curve; or
when the current open circuit voltage of the second cell is not located in the plateau of the SOC-OCV curve of the second cell, determine that the initial SOC of the first cell is a currently obtained initial SOC.

12. The device according to claim 9, wherein the processor is further configured to:
obtain a current open circuit voltage of the second cell;
when the current open circuit voltage of the second cell is located in the plateau of the SOC-OCV curve of the second cell, determine that the initial SOC of the second cell is an initial SOC of the second cell that is obtained and stored when a previous open circuit voltage of the second cell is not located in the plateau of the SOC-OCV curve of the second cell; or,
when the current open circuit voltage of the second cell is not located in the plateau of the SOC-OCV curve of the second cell, determine that the initial SOC of the second cell is a currently obtained initial SOC.

13. The device according to claim 9, wherein the processor is further configured to:
obtain, when it is detected that the second cell is in a fully charged state, the initial SOC of the second cell, obtain a SOC in which the first cell is located when the second cell is in the fully charged state, and use the obtained SOC as the initial SOC of the first cell; or
obtain, when it is detected that the second cell is in a low-end static standing state, a sampled voltage of the first cell, and obtain the initial SOC of the first cell based on the SOC-OCV curve of the first cell, obtain a sampled voltage of the second cell, and obtain the initial SOC of the second cell based on a SOC-OCV curve of the second cell.

14. The device according to claim 9, wherein the second cell comprises a plurality of single cells, each single cell corresponds to one SOC, and in determining the SOC of the battery pack based on the SOC of the second cell, the processor is configured to:
obtain a maximum SOC and a minimum SOC from a plurality of SOCs of the single cells; and
obtain a weighted SOC based on the maximum SOC and the minimum SOC, and use the weighted SOC as the SOC of the second cell,
wherein a SOC of a single cell is estimated based on the capacity variation of the battery pack, the nominal capacity of the first cell, the equalization capacity of the first cell, the equalization capacity of the single cell, and an initial SOC of the single cell.

15. The device according to claim 9, wherein the processor is further configured to:
determine, based on the initial SOC, the nominal capacity, and a state of health (SOH) of the first cell, a charge capacity required for fully charging the first cell or a discharge capacity required for fully discharging the first cell;
determine, based on the initial SOC, a nominal capacity, and an SOH of the second cell, a charge capacity required for fully charging the second cell or a discharge capacity required for fully discharging the second cell;
determine, when the charge capacity of the first cell is less than the charge capacity of the second cell, that the first cell is to be fully charged first before the second cell; and
determine, when the discharge capacity of the first cell is less than the discharge capacity of the second cell, that the first cell is to be fully discharged first before the second cell.

16. The device according to claim 9, wherein the processor is further configured to:
determine a current SOC of the first cell; and
determine the SOC variation of the first cell based on the current SOC of the first cell and the initial SOC of the first cell;
wherein the initial SOC of the first cell is determined based on a current open circuit voltage of the second cell;
when the current open circuit voltage of the second cell is located in the plateau of the SOC-OCV curve of the second cell, the initial SOC of the first cell is an initial SOC of the first cell that is obtained and stored when a previous open circuit voltage of the second cell is not located in the plateau of the SOC-OCV curve; or when the current open circuit voltage of the second cell is not located in the plateau of the SOC-OCV curve of the second cell, the initial SOC of the first cell is a currently obtained initial SOC.

* * * * *